United States Patent Office 3,337,095
Patented Aug. 22, 1967

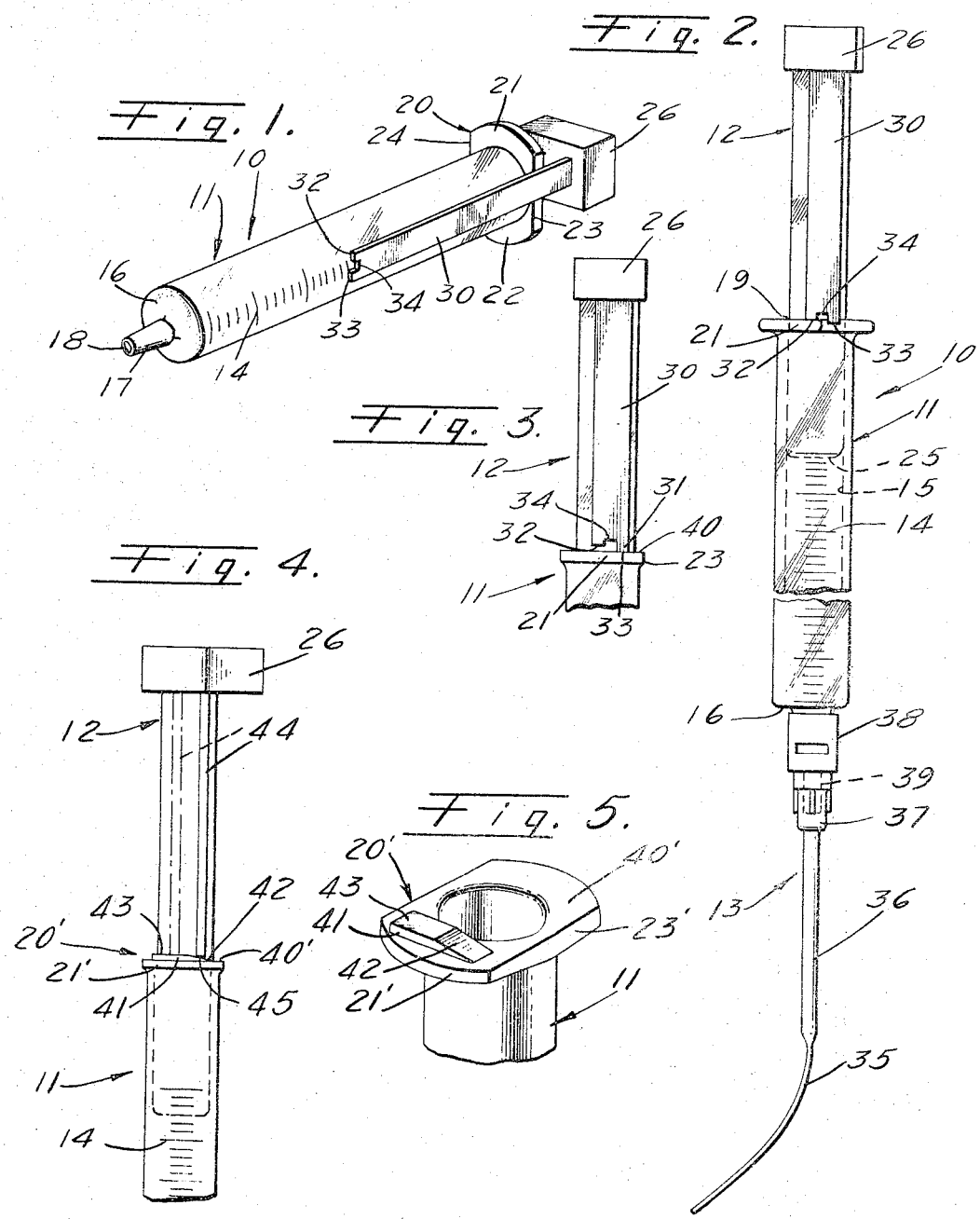

3,337,095
SYRINGE FOR AUTOMATIC PROPORTIONING
Jacob P. Marbach, 17736 Kinzie St., Northridge, Calif. 91324, and Edward P. Marbach, 4607 Marwood Drive, Los Angeles, Calif. 90065
Continuation of application Ser. No. 463,313, June 11, 1965. This application Aug. 29, 1966, Ser. No. 575,853
4 Claims. (Cl. 222—309)

This application is a continuation of patent application Ser. No. 463,313, filed June 11, 1965, now abandoned, and a continuation-in-part of application Ser. No. 361,002, filed Apr. 20, 1964, now Patent No. 3,236,423.

The apparatus and invention here under consideration has reference to chemical analysis which depends upon accurately proportioning different liquids. The apparatus is in the form of laboratory glassware arranged in such fashion that two different liquids can be sampled, one in relatively large amount and the other in relatively small amount, to make possible diluting one with the other in precise proportions for subsequent analysis.

One of the common daily needs in laboratory analysis is the analysis of blood. Determinations of this kind are taken routinely and daily by the thousands, but precise determination is critical in that it involves the life and health of humans. In order to have such determinations dependable, each analysis must be clean and clear of every preceding analysis so that there is no inadvertent contamination. The common practice heretofore has been to make use of a separate measuring device, commonly termed a pipet, for each unknown fluid to be analyzed and to dilute it with a measured quantity of diluent. No means has heretofore been proposed for washing the pipet clear of the unknown and consequently, once used, the pipet has to be cleaned before reuse. This practice requires great quantities of glassware and the perpetual need for cleaning substantial quantities of such glassware each and every day. Further still, the pipet system of measuring the unknown fluid requires considerable physical effort in that the unknown is drawn into the pipet by mouth suction and the quantity measured in the pipet by discharging any excess or drawing in any deficiency. Further still, in measuring in this fashion, measurement is not precise, depending as it does upon the personal equation. There is, accordingly, a definite limit to the number of analyses which can be accomplished due in part to the fact that the technician may become fatigued. Fatigue is also a considerable factor in comparing the preciseness and dependability of the analysis.

It is, therefore, among the objects of the invention to provide a new and improved syringe for automatically proportioning different liquids which can be simple in its construction, relatively easy to build with a high degree of accuracy and can be operated rapidly and with dependable accuracy.

Another object of the invention is to provide a new and improved syringe for automatic proportioning which can be used repeatedly for many operations without need for cleaning between each operation.

Still another object of the invention is to provide a new and improved syringe for automatic proportioning whereby two fluid samples can be drawn and measured strictly automatically thereby to eliminate errors due to personal equation.

Still another object of the invention is to provide a new and improved automatic syringe for proportioning adapted for use in chemical analyses sufficiently accurate and automatically precise so that it can continue to be used repeatedly thereby to eliminate errors which are frequent in prior practices where different syringes have to be alternated in use, the syringes by reason of their inherent construction not being exactly alike. The same practice applies where pipets are used.

Still another object of the invention is to provide a new and improved syringe for automatic proportioning which minimizes the prospect of contamination of one sample with another.

Another object of the invention is to eliminate valving of the kind which has been a troublesome objection in laboratory apparatus heretofore employed for the purpose of overcoming objectionable practices long recognized in this technique.

Further included among the objects of the invention is to provide a syringe for automatic proportioning which by reason of its construction is extremely simple to understand and work with, which accordingly, is relatively inexpensive to construct without sacrifice of the necessary precision requirements and wherein the syringe capacity is so related to the capacity of a special sampling needle as to make certain that the second sampled fluid is not mixed in the syringe itself with the first sampled fluid, thereby providing a dependable device which can be used for long periods of time without fatigue and by persons with no more than moderate skill in this particular field.

With these and other objects in view, the invention consists in the construction, arrangement, and combination of the various parts of the device, whereby the objects contemplated are attained, as hereinafter set forth, pointed out in the appended claims and illustrated in the accompanying drawings.

In these drawings:

FIGURE 1 is a side perspective view of one form of the device in closed position;

FIGURE 2 is a side elevational view of the device of FIGURE 1 with a sampling needle attached to it and showing the device in operating condition;

FIGURE 3 is a side elevational view of the upper end of the device of FIGURE 1 showing a subsequent relationship of operating parts;

FIGURE 4 is a fragmentary view of the upper working end of a second form of the invention;

FIGURE 5 is a top fragmentary perspective view of the barrel of the device used in FIGURE 4.

In the first embodiment of the invention chosen by way of illustration and shown especially in FIGURES 1, 2, and 3 of the drawings, there is pictured a syringe indicated generally by the reference character 10 consisting in the main of a barrel 11, a plunger 12, and a sampling needle 13. The barrel and plunger are customarily both made of laboratory glass. The barrel 11 is substantially cylindrical and provided with graduations 14 along the barrel to measure the amount of fluid or liquid drawn into a reservoir chamber 15. The barrel is partially closed by a bottom wall 16 from which extends a projection 17 provided with an intake opening 18. At the opposite end of the barrel is a clear opening 19. Extending radially outwardly from the adjacent end of the barrel is a flange 20 having relatively wide portions 21 and 22 and relatively narrow portions 23 and 24. The narrow portions provide in effect a passage for the gauge where it passes the flange.

As shown in FIGURES 1, 2, and 3 the plunger 12, substantially cylindrical in form, is adapted to slide in the usual fashion through the clear opening 19 of the barrel into the chamber 15 with a free sliding, but substantially liquid tight fit. An inner end 25 of the plunger is closed and on the outer end is a handle 26, which is a permanent part of the plunger. Fastened upon the handle is a gauge stick member 30, which, in the chosen embodiment, is relatively wide and flat. The gauge stick member is spaced radially from the center of the plunger a distance sufficient so that its clears the narrow portion 23 or the narrow portion 24 of the flange 20, but does not clear the wide portions 21 and 22.

At the lower or free end 31 of the gauge stick 30 is a stepped construction consisting of a first section 32 at one selected distance from the handle and a second section 33 at another selected distance from the handle. A space 34 separates the sections 32 and 33. The sections 32 and 33 are adapted to cooperate with the wide portion 21 or the wide portion 22 of the flange 20, as the case may be, these wide portions forming contacts for engagement with the first and second sections 32 and 33 which comprise the end portion of the gauge stick 30.

When the device is to be employed in the customary way use is made of the sampling needle 13. The sampling needle consists of an inflow or pick-up part 35 which is joined to a reservoir part 36. At the upper end of the reservoir part is an enlargement 37. For attaching the sampling needle 13 to the barrel 11 there is provided a fitting sleeve 38 which may be permanently secured at one end of the projection 17. At the other end is a nipple 39 which projects into the enlargement 37 making a liquid tight joint when the enlargement is pressed into engagement with it with a press fit. Good practice suggests that the sampling needle be constructed of one of the acceptable synthetic plastic resin materials so that it will not be fragile, but is permitted to yield to a degree and so that it can be readily formed in a desired shape. The capacity of the reservoir part 36 is made slightly greater than the volume of the second fluid or liquid to be sampled.

In use all the parts are assembled as shown in FIGURE 2. The first fluid drawn into the reservoir chamber 15 is customarily a diluent. This fluid is normally proportionately large in quantity. To accomplish this the sampling needle 13 is immersed in a flash of diluent (not shown), the plunger pumped to make certain all air bubbles are excluded, and then withdrawn by manipulation of the handle 26. As the plunger is withdrawn in this fashion fluid flows first into the pick-up part 35 then into the reservoir part 36 and then finally into the reservoir chamber 15 of the barrel 11. The plunger 12 is withdrawn until the lower or free end 31 of the gauge stick member 30 passes to a position above the flange 20. The precisely desired quantity of diluent is determined by placing the first section 32 at the free end of the gauge stick member upon an upper surface 40 of the flange 20. This can be done either by sliding the first section over the edge of the flange 20 as the gauge stick member is lifted through the clearance provided by the narrow portion 23 or the gauge stick member can be lifted slightly higher than the upper surface 40 and then moved downwardly until the first section 32 comes into engagement with the upper surface 40. In either event a precisely determined amount of diluent will be drawn into the reservoir chamber 15.

The sampling needle is then withdrawn from the flask of diluent and immersed in a quantity of the fluid specimen to be analyzed. This is often blood where a blood analysis is desired, but may, of course, be virtually any liquid where an analysis is the operation desired. The pick-up tube, accordingly, is immersed in the second fluid and the plunger 12 then withdrawn only a slight amount, this withdrawal being controlled by keeping the section 33, preferably bevelled, in engagement with the upper surface 40, so that no more than the correct amount of second fluid is withdrawn. The amount of withdrawal is measured by the difference between the position of the second section 33 at the free end of the gauge stick member 30 and the position of the first section 32. The difference between these two positions determines the amount of additional travel of the plunger 12. As the plunger moves for that much additional distance outwardly relative to the barrel 11 a corresponding volume of the second fluid is drawn into the sampling needle. Because the volume of the reservoir part 36 of the sampling needle is greater than the volume determined by this last described plunger movement the second fluid to be sampled will only partially fill the sampling needle and none will ever be drawn into the reservoir chamber 15. In reality the difference in position between the first section 32 and the second section 33 is only a few thousandths of an inch, although the difference in positions has been exaggerated in FIGURES 2 and 3 in order to explain the operation.

After both of the fluids have thus been drawn into the syringe, they are emptied into an appropriate container (not shown). This is accomplished by rotating the handle 26 to a position so that the gauge stick member 30 is in alignment with the clearance formed opposite the narrow portion 23 and the plunger then moved inwardly relative to the barrel. Since customarily the second fluid in the sampling needle may be only five percent or less than the amount of fluid in the reservoir chamber 15 the second fluid will first be pushed out of the sampling needle and the diluent which was the first fluid drawn into the reservoir chamber is then pushed out afterwards. The quantity of diluent is so great relatively that the diluent completely washes the interior of the sampling needle clean of the second fluid as it is discharged. When the plunger finally bottoms on the interior of the barrel all of the fluids have been discharged, accurately proportioned because of the inherent structure of the syringe and the fluids are ready for analysis. Since the sampling needle has been completely washed clean of the second fluid the entire syringe assembly is then ready for use in picking up a second quantity of diluent and appropriate fluid to be analyzed without need for washing or sterilizing. The operation can accordingly be repeated innumerable times and with a dependable degree of accuracy by the simple method of use of the automatically proportioning syringe which has just been described.

It will be understood, of course, that on those occasions where the proportion is to be different as between the diluent and the fluid to be analyzed a different setting of the distance between the first section 32 and second section 33 at the free end of the gauge stick member can be made.

In a second form of the device illustrated in FIGURES 4 and 5 proportioning is accomplished by the provision of steps made on the flange indicated by the reference character 20'. Upon the surface 40', here for convenience identified as a section since it need not be of any appreciable area, there is provided an elevated platform 41 on one side of which is a sloping approach 42 leading up to a section 43. Although in FIGURES 4 and 5 the platform is suggested as being made of a separate piece attached to the flange 20', it will be appreciated that the same result can be accomplished by merely shaping the flange 20' itself in order to provide two different sections.

In order to make use of this form of device there is attached to the handle 26 a gauge stick member 44 having a free end 45 which may either be an edge extending straight across or slightly beveled for convenience. The gauge stick member 44 is mounted in the same fashion as the previously described gauge stick member 30 in that it is anchored in the handle 26 at a position so that it lies parallel to the plunger 12 and spaced far enough away so that it can pass freely along side of the narrow portion 23' of the flange 20'.

The form of device of FIGURES 4 and 5 is made use of in substantially the same fashion as has been described in FIGURES 1, 2, and 3. That is to say, when the procedure starts the plunger 12 is extended its full available distance into the barrel 11 and the sampling needle is inserted into the diluent. Thereafter in this form of the invention when the plunger is withdrawn outwardly to draw the diluent or first fluid into the reservoir chamber 15 the extent of withdrawal of the plunger is established by placing the free end 45 of the gauge stick member 44 upon the section 40' of the flange 20'. This can be accomplished either by sliding the free end 45 over the edge or by moving it slightly beyond the section 40' and then returning it back to that section. This position of the plunger relative to initial position establishes the quantity or volume of diluent drawn into the reservoir chamber 15.

Then when the sampling needle 13 is immersed in the fluid to be sampled the handle 26 is rotated so that the free end 45 climbs the sloping approach 42 until it rests upon the section 43. The difference between the endwise position of the section 40′ and the position of the section 43 establishes the distance the plunger 12 moves in the reservoir chamber 15 and that difference in position will fix the volume or quantity of the second fluid which is drawn into the sampling needle 13. Here again by having the volume of the reservoir part 36 of the sampling needle 13 more than the volume set by movement of the plunger through the second distance established by the difference in position between the two sections 40′ and 43. None of the second liquid will be drawn into the reservoir chamber 15 and thorough and complete washing will be accomplished as the diluent is discharged through the sampling needle following discharge of the fluid to be sampled.

From the foregoing description it will be appreciated that the automatic proportioning syringe can have the proportions fixed in its construction so that there can be no deviation from the fixed proportion irrespective of how the syringe may be handled. The structure, moreover, is such that where a different proportioning is desired the different proportioning adjustment can be simply made by changing the locations of engagement between the flange and the gauge stick member irrespective of whether the difference in locations is the result of how the flange is constructed or how the gauge stick is constructed. The number of structural elements, accordingly, is held to a substantial minimum and the device made as one which can be easily adjusted, stored, sterilized, and handled for precise analytical measuring requirements.

Although the invention has been described as being one for employment of a second fluid, the same precise measuring means can be duplicated to withdraw a third fluid, small in quantity, after which both the second and the third fluids can be washed out by discharge of the diluent.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A proportioning syringe comprising a substantially cylindrical barrel having a chamber therein, an intake opening at one end and a substantially clear opening at the other end, a radially outwardly extending flange member on said barrel adjacent said clear opening, said flange member having a passage at a lesser distance radially outwardly than other parts thereof, a plunger having a sliding fit at one end in said chamber, said plunger being adapted to draw fluid into said chamber, and a single unitary gauge stick member, one end of said single unitary gauge stick member being attached to the plunger at the other end of said plunger and extending along and spaced from said barrel at a location passing the passage part of said flange member, sliding contact portions respectively on the other end of said gauge stick member and on said flange member, both of said portions extending in a direction transverse to an axial direction and comprising an engagement therebetween when said plunger is at a selected location in said chamber relative to an innermost location whereby to establish the quantity of fluid in said chamber in response to movement of the plunger outwardly, one of said portions comprising a plurality of contiguous sections at different axial locations, a first of said sections at one selected axial location being adapted to establish a first volume of fluid in said chamber of one quantity and a second of said sections at another selected axial location being adapted to establish an additional volume of fluid in said chamber.

2. A proportioning syringe comprising a substantially cylindrical barrel having a chamber therein, an intake opening at one end and a substantially clear opening at the other end, a hollow sampling needle having a reservoir part at one end, a pick-up part at the other end and a connection adapted to attach said sampling needle at the end thereof adjacent said reservoir part to the barrel at the intake opening, a radially outwardly extending flange member on said barrel adjacent said clear opening, said flange member having a passage part at a lesser distance radially outwardly than other parts thereof, a plunger having a sliding fit at one end in said chamber, said plunger being adapted to draw fluid through said sampling needle into said chamber, and a unitary gauge stick member having one end thereof attached to said plunger and extending along and spaced from said barrel at a location adapted to pass the passage part of said flange member, sliding contact portions respectively on the other end of said gauge stick member and on said flange member comprising an engagement therebetween when said plunger is at a selected endwise location in said chamber relative to an innermost location whereby to establish the quantity of fluid in said chamber, one of said portions comprising a first section at one selected endwise location adapted to establish a volume of fluid in said chamber of relatively large quantity and a second section at another selected endwise location adapted to establish an additional volume of fluid in said chamber of relatively small quantity, said additional volume being less than the volume of said reservoir part of the sampling needle.

3. A proportioning syringe comprising a substantially cylindrical barrel having a chamber therein, an intake opening at one end and a substantially clear opening at the other end, a radially outwardly extending flange member on said barrel adjacent said clear opening, said flange having a passage part thereof at a lesser distance radially outwardly than the rest of said flange, a plunger having a sliding fit at one end in said chamber, said plunger being adapted to draw fluid into said chamber, and a unitary gauge stick member having one end thereof attached to said plunger at the other end of said plunger, said gauge stick extending along and spaced from said barrel at a location adapted to pass the passage part of said flange member, sliding contact portions respectively on the other end of said gauge stick member and on said flange member, said portions comprising an engagement therebetween when said plunger is at a selected endwise location in said chamber relative to an innermost location whereby to establish the quantity of fluid in said chamber, one of said portions comprising a first section at one selected endwise location adapted to establish a volume of fluid in said chamber of relatively large quantity and a second section at another selected endwise location adapted to establish an additional volume of fluid in said chamber of relatively small quantity, said first and second sections comprising contiguous end faces at different endwise locations on said other end of said gauge stick member.

4. A proportioning syringe comprising a substantially cylindrical barrel having a chamber therein, an intake opening at one end and a substantially clear opening at the other end, a radially outwardly extending flange member on said barrel adjacent said clear opening, said flange member having a passage part at a lesser distance radially outwardly than other parts thereof, a plunger having a sliding fit at one end in said chamber, said plunger being adapted to draw fluid through said sampling needle into said chamber, and a unitary gauge stick member having one end thereof attached to said plunger at the other end of the plunger, said gauge stick member extending along and spaced from said barrel at a location passing the passage part of said flange member, sliding contact portions respectively on the other end of said gauge stick member and on said flange member, said contact portions comprising an engagement therebetween when said plunger is at a selected endwise location in said chamber relative to innermost location of said plunger in said chamber, one of said portions comprising a first section at one selected endwise location adapted to establish a volume of fluid in said chamber of relatively large quantity and a second section at another selected endwise location adapted to establish an additional volume of fluid in said chamber of relatively small quantity, said first and second sections comprising faces at different endwise locations on said flange member adjacent the passage part of said flange member and the free end of said gauge stick.

References Cited

UNITED STATES PATENTS

| | | | |
|---|---|---|---|
| 2,607,343 | 8/1952 | Sarver | 128—218 |
| 2,739,591 | 3/1956 | Yochem. | |
| 3,052,239 | 9/1962 | Silver et al. | |
| 3,236,423 | 2/1966 | Marbach et al. | 222—309 |

ROBERT B. REEVES, *Primary Examiner.*

N. L. STACK, *Examiner.*